Figure 1:
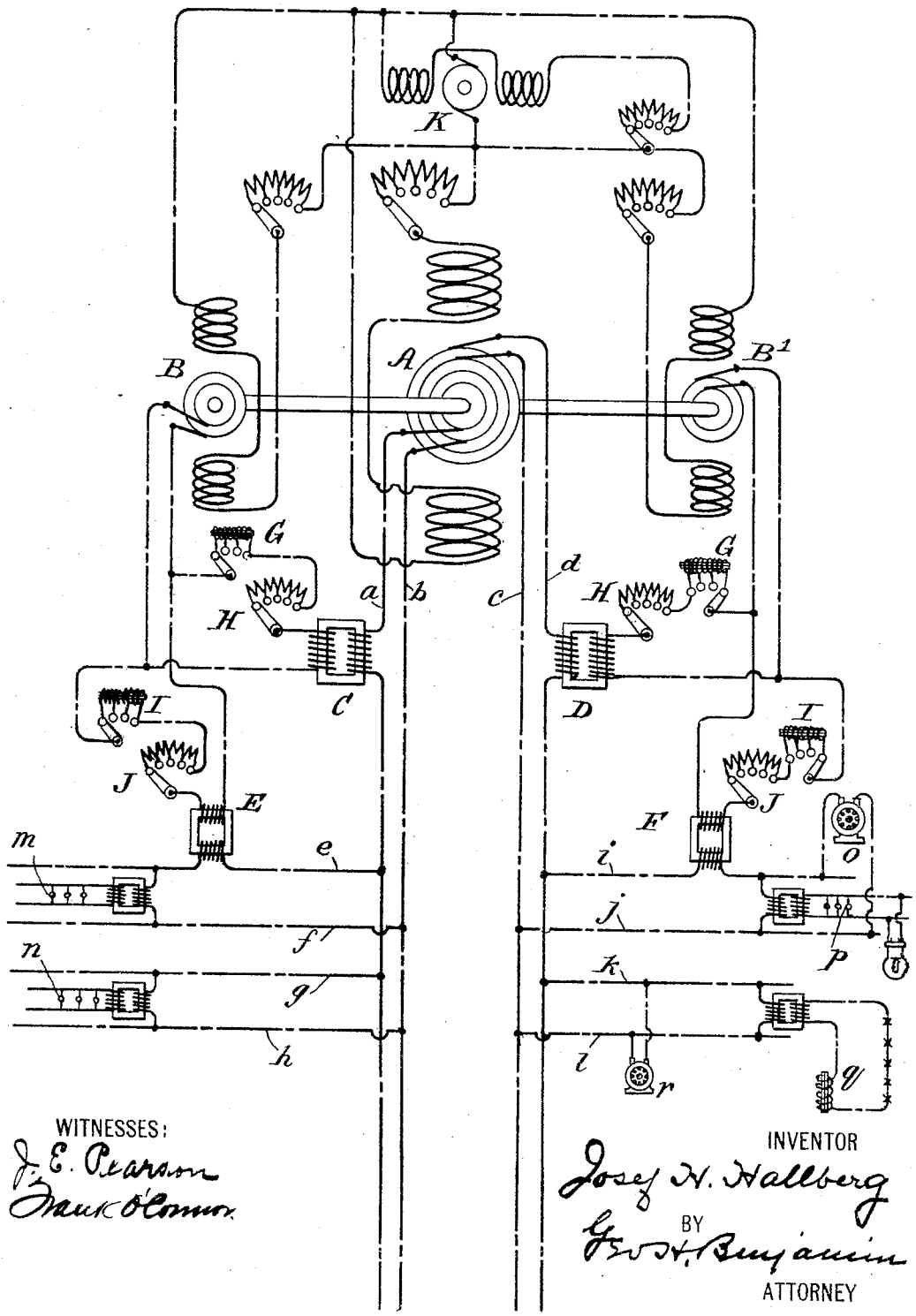

No. 767,477. PATENTED AUG. 16, 1904.
J. H. HALLBERG.
SYSTEM OF ELECTRICAL DISTRIBUTION.
APPLICATION FILED OCT. 16, 1903.
NO MODEL. 3 SHEETS—SHEET 1.

WITNESSES:
J. E. Pearson
Frank O'Connor

INVENTOR
Josef H. Hallberg
BY
Geo. H. Benjamin
ATTORNEY

No. 767,477. Patented August 16, 1904.

UNITED STATES PATENT OFFICE.

JOSEF HENRIK HALLBERG, OF NEW YORK, N. Y.

SYSTEM OF ELECTRICAL DISTRIBUTION.

SPECIFICATION forming part of Letters Patent No. 767,477, dated August 16, 1904.

Application filed October 16, 1903. Serial No. 177,360. (No model.)

*To all whom it may concern:*

Be it known that I, JOSEF HENRIK HALLBERG, a citizen of the United States, residing at New York city, county and State of New York, have invented certain new and useful Improvements in Systems of Electrical Distribution, of which the following is a specification.

My invention relates to a system of distribution employing alternating currents of the single or polyphase type.

The object of my invention is to provide means for automatically maintaining the voltage in the mains of a single or polyphase system and irrespective of the character of the translating devices connected in said mains.

Where alternating-current generators, and more especially those of the single or polyphase type, are employed in a system of electrical distribution for both light and power, a serious difficulty is experienced—*i. e.*, that now commonly known as "unbalancing," or otherwise the production of a variation in voltage in the mains of the system and usually due to unequal distribution of load. In some cases, however—as, for instance, in interconnected two or three phase systems, where the load is reactive and of varying power factor or where the distributing-conductors contain reactance—the voltages in the different mains or sides of the system become unequal even if the loads in different phases of the system are equal.

Broadly speaking, my system of automatic regulation comprehends means for effecting the balancing of the voltages in the mains of the system, and the best means of accomplishing this result of which I am now aware consists in opposing the normal voltage or voltages in the mains by a counter or bucking voltage or voltages, employing the resultant current or currents in the distributing-circuit, and in varying such opposing voltage or voltages in accordance with the reactive effects of the loads in the distributing circuit or circuits.

To produce the opposing voltage or voltages, I make use of a transformer having its primary connected across the conductors of an auxiliary small generator driven at the same speed as the main generator and producing a current which under normal conditions is in phase with the current and electromotive force from the main generator and having its secondary connected in series in one of the conductors carrying a current phase from the main generator.

I have discovered that when the current and the electromotive force in the leads from the main generator are nearly in phase—that is, when the load on the generator is practically non-inductive—and when the current from the auxiliary generator is also in phase with the current and electromotive force from the main generator the opposing current from the auxiliary generator is at the maximum and that this is the normal operating condition of the system and, further, that the opposition to the current from the main generator will continue constant so long as these opposing currents and their electromotive forces are in phase. When, however, the load on the main generator is changed from a non-inductive load to a load of considerable reactance—such as is produced by induction-motors, arc-lamps, and the like—the current in the main circuit will lag behind the electromotive force of the main generator, and the amount of lag or change in phase relation between the current and the electromotive force will depend upon the power factor and quantity of the load.

The automatic regulation or balancing in my improved system depends upon the described changes in phase relation and the consequent variation in the value of the current opposed to the current or currents from the main generator.

Stated in simpler terms, my improved system comprehends generating a current or series of currents of defined voltage—for instance, one hundred and fifty volts—opposing such current or currents by counter opposing currents—say of twenty-five volts—using the resultant current—*i. e.*, one hundred and twenty-five volts—in the distributing-circuit and varying the voltage of the opposing current in proportion to the reactive effects of the devices in the distributing-circuit—as, for instance, assuming the reactive effects to represent ten volts—correspondingly reducing the opposing voltage by such ten volts, and accomplishing the above-stated results by effecting a displacement of the phase relations of the two alternating currents delivered in opposition in the same conductor or conductors.

Figure 2:
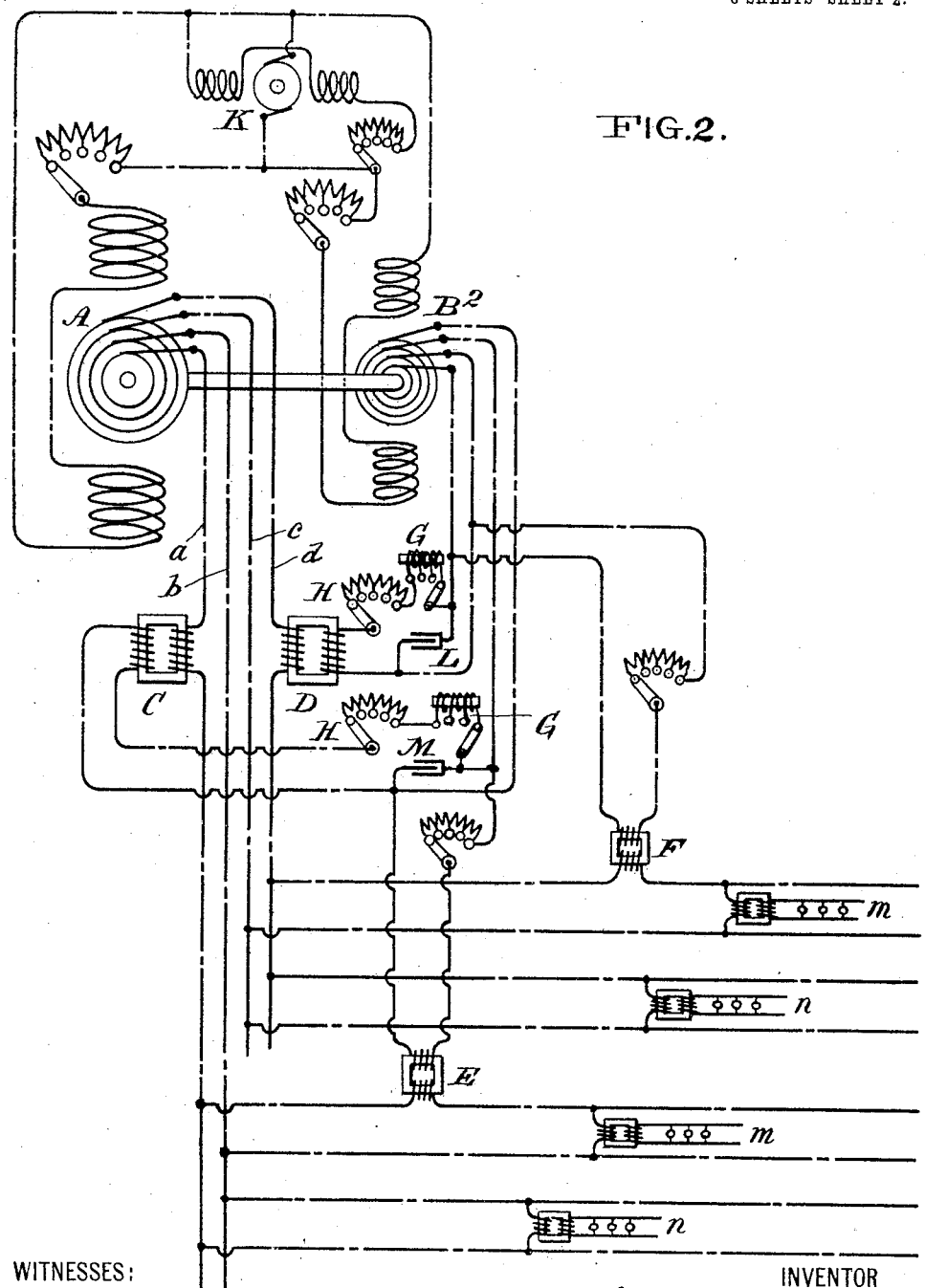

Figure 1 illustrates diagrammatically the application of my invention to a two-phase system of electrical distribution. Fig. 2 shows a modified arrangement where a single generator of opposing currents is used in place of two generators. Figs. 3, 4, 5, and 6 are graphical representations of the phase relations between the currents from the main generator and the opposing generators under different load conditions.

Referring to the drawings, A represents a source of two-phase current of any appropriate character—such, for instance, as a two-phase generator; B B', Fig. 1, two small single-phase generators; $B^2$, Fig. 2, a small two-phase generator. Phase 1 from the generator A is conducted over the mains $a\ b$, while phase 2 is conducted over the mains $c\ d$. Leading from these mains are the distributing-conductors $e\ f$, $g\ h$, $i\ j$, $k\ l$, and arranged in these distributing-conductors are translating devices $m\ n$, $o\ p$, $q\ r$. In the diagrams the small generators B, B', or $B^2$ are represented as driven from the shaft of generator A. Any other method of maintaining these generators at fixed speeds relative to the rotating member of A can be employed.

C D are transformers having their primaries respectively in circuit with the small generators B B' and their secondaries respectively in series in the mains $a\ d$. E F are similar but smaller transformers having their primaries respectively in circuit with the small generators B B' and their secondaries in series, respectively, with the distributing-conductors $e\ i$.

G H are regulating devices for the transformers C D, and I J regulating devices for the transformers E F. These regulators are preferably of a combined reactive and nonreactive type, each element having its own independent adjustment.

The transformers C D E F may be connected to aid or oppose the current from the generator A, and by reversing the current in either the primary or the secondary windings of any of these transformers as connected they can be made to oppose or boost the main current. In order, however, as previously stated, to obtain automatic balancing of phases in my system of electrical distribution, the transformers C D E F are preferably so connected that the currents from their secondaries will be delivered in opposition to the currents from the generator A.

The excitation of the field-magnets of the generators A, B, B,' or $B^2$ is accomplished by means of the direct-current generator K.

In Fig. 2 condensers L M are shown as interposed in the primaries of the transformers D F, the object of which will be hereinafter described.

For convenience of explanation I have shown a practically non-inductive load $m\ n$, connected in mains $a\ b$, transmitting phase 1, and a practically inductive load $o\ p$, $q\ r$, connected in mains $c\ d$ and transmitting phase 2.

Figure 3:
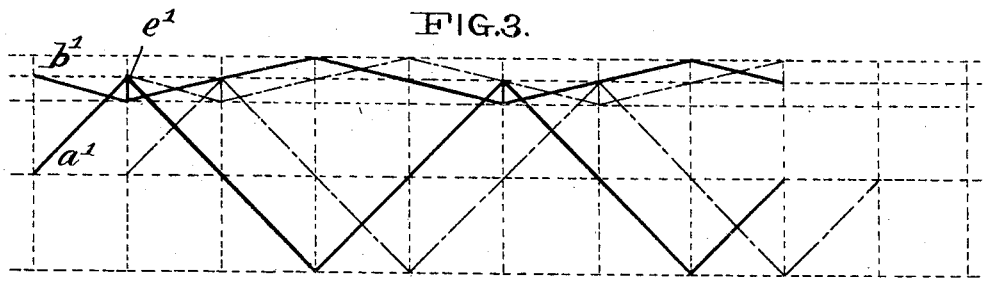
Figure 4:
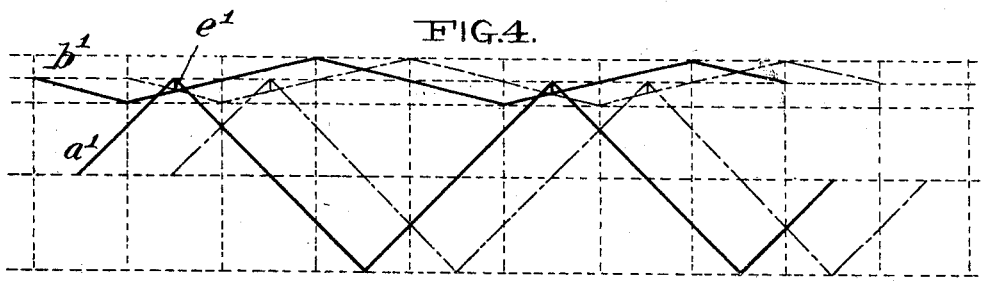
Figure 5:
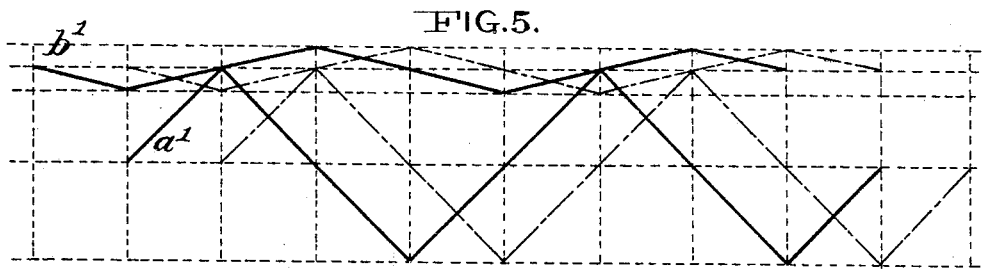

The operation of my improved system is as follows, and in order to make the explanation clear I will refer to Figs. 3, 4, and 5. Assuming that there is no inductive load, the current and electromotive force of generator A will at such time be in phase with the current from generator B', and the opposing effect of the transformer D will be at a maximum. This is graphically represented in Fig. 3, in which $a'$ is the current of phase 1 of generator A and $b'$ the current from generator B'. The opposing value of $b'$ is indicated by the ordinate $e'$. Assuming a load of considerable reactance, the phase relations under this condition are indicated in Fig. 4, in which the current $a'$ of generator A lags behind its own electromotive force and also behind the current $b'$ from generator B'. Owing to this change in phase relation, the opposing current from generator B' becomes less effective, as is indicated by the reduced length of the ordinate $e'$. Assuming the load to be wholly inductive, this condition is represented in diagram, Fig. 5. In this case it will be observed that the current $a'$ lags ninety degrees behind its own electromotive force and the ordinate $e'$ has entirely disappeared, indicating that current of $b'$ offers no opposition to the current from $a'$.

In the practical operation of such a system as that described it may be required to furnish currents to operate apparatus which introduce leading currents, such as over-excited synchronous motors, rotary converters, condensers, underground cables, &c. Such currents tend to disturb the balance of the phases of the systems. My system is equally well adapted to regulate a system for leading and lagging currents.

Assuming that it is necessary to regulate for both leading and lagging currents, I prefer to cause the current $b'$ from generator B' (see Fig. 6) to lead the current $a'$ from generator A, so that when current $a'$ is in phase with its own electromotive force the opposing value of the current $b'$ is not at its maximum. It will be observed that the ordinate $e'$ in this figure is shorter than the ordinate $e'$ in Fig. 3. If, however, the current $a'$ should lead its electromotive force, the current $b'$ from generator B' will be more effective and will offer greater opposition to current $a'$ of generator A.

The diagrams, it will be observed, indicate the relation of the phases of a two-phase system, $a'\ b'$ representing the phase relation of the currents from the generators A B, although I have used this diagram to generally describe the phase relations in the side of the system containing the reactive or inductive translating devices—that is, between generators A B'—c' d' the phase relations of the currents from generators A B'—that is, respectively, phases 1 and 2. The phases are arranged ninety degrees apart—i. e., phase 2 ninety degrees behind phase 1. The angular displacement, however, is not material.

Figure 6:
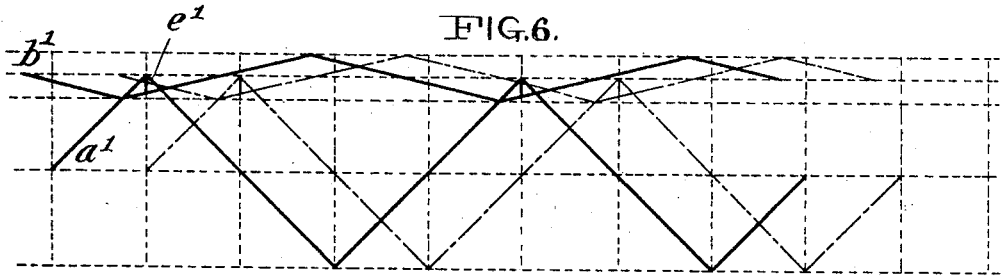

In order to cause the current $b'$, Fig. 6, from generator B and $d'$ from generator B' to lead currents $a'$ of phase 1 and $c'$ of phase 2, respectively, from generator A, I prefer to fix the lead of the armatures of the generators B B' in relation to the armature of the generator A. If, however, this should not be convenient in practice, the necessary phase displacement or lead of currents $b'$ $d'$ may be accomplished by making use of the condensers connected as shown in Fig. 2. The operation of such condensers in altering the phase relations is now well understood, and it will not be necessary for me to enter into it.

So far I have only referred to the regulating effect of the transformers C D upon the mains carrying the phases. It will be readily understood that a corresponding effect may be obtained upon the branch circuits through transformers E F.

Having thus described my invention, I claim—

1. The herein-described method of effecting current regulation, which consists in opposing to a current phase a current derived from a separate source but corresponding in phase, automatically varying the phase relation of said two currents, and transmitting the resultant current to the distributing-conductors.

2. The herein-described method of effecting current regulation, which consists in opposing two currents corresponding in phase and derived from two generators, varying the phase relation of such currents in accordance with the variations in the inductive or reactive load, and transmitting the resultant current to the distributing-circuit.

3. The herein-described method of effecting current regulation, which consists in transmitting two currents corresponding in phase and derived from two generators to the distributing-conductors of the system, varying the phase relation of said currents in accordance with the variations in load, and transmitting the resultant current to the distributing-circuit.

4. The herein-described method of effecting current regulation, which consists in opposing two currents corresponding in phase and frequency and derived from two generators, automatically varying the phase relation of said currents, and transmitting the resultant current to the distributing-conductors.

5. The herein-described method of effecting current regulation, which consists in opposing an induced alternating current to a directly-produced alternating current, said currents corresponding in phase, varying the phase relation of said currents, and transmitting the resultant current to the distributing-circuit.

In testimony whereof I affix my signature in the presence of two witnesses.

JOSEF HENRIK HALLBERG.

Witnesses:
J. E. PEARSON,
FRANK O'CONNOR.